United States Patent [19]

Dethlefs

[11] 4,162,587
[45] Jul. 31, 1979

[54] FISHING POLE

[76] Inventor: David H. Dethlefs, 4117 NE. 10th Pl., Renton, Wash. 98055

[21] Appl. No.: 730,666

[22] Filed: Oct. 7, 1976

[51] Int. Cl.² ............................................. A01K 91/00
[52] U.S. Cl. .................................................. 43/18 R
[58] Field of Search ...................... 43/18 R, 19, 17, 15, 43/16

[56] References Cited

U.S. PATENT DOCUMENTS

| | | | |
|---|---|---|---|
| 2,351,734 | 6/1944 | Backe | 43/18 R |
| 3,451,155 | 6/1969 | Huliew | 43/15 |

*Primary Examiner*—William Pieprz
*Attorney, Agent, or Firm*—Charles L. Kraft, II

[57] ABSTRACT

The fishing pole comprises at least a pair of hingedly mounted, rigid rod sections, and a spring biasing the rod sections with a predetermined spring constant. In further embodiments the fishing pole may include a multiplicity of rod sections, and arrangement of springs including springs mounted between an outrigger, or internally mounted springs. The fishing rod may be adapted to electric warning signals and the like which employ the hinged mounting and mechanically urged structure. A still further embodiment employs a rigid pole frame and a spring urging means simulating tubular flex.

6 Claims, 3 Drawing Figures

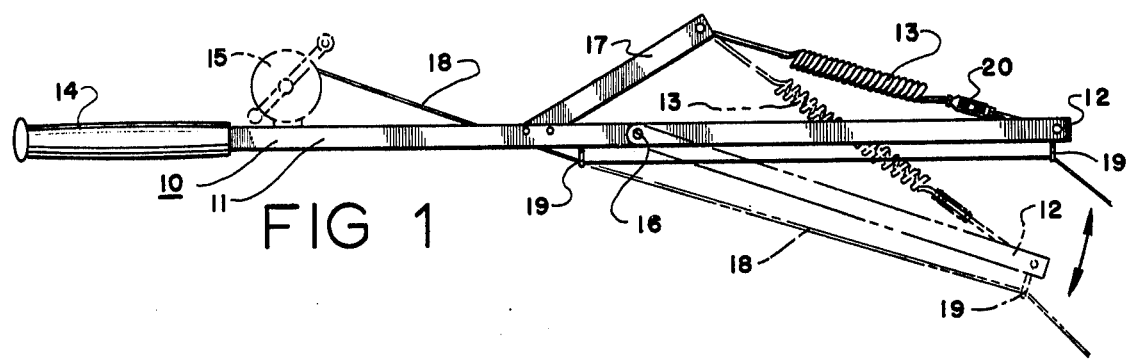
FIG 1
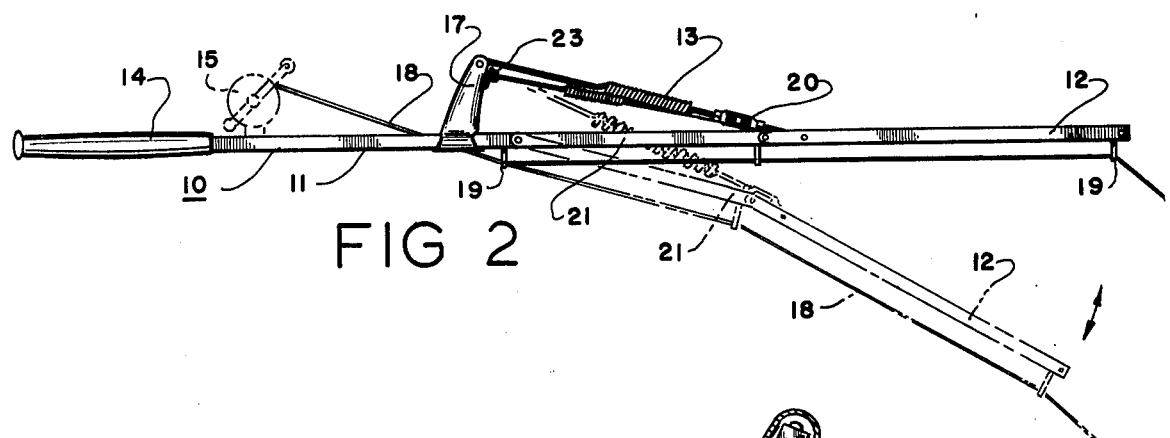
FIG 2
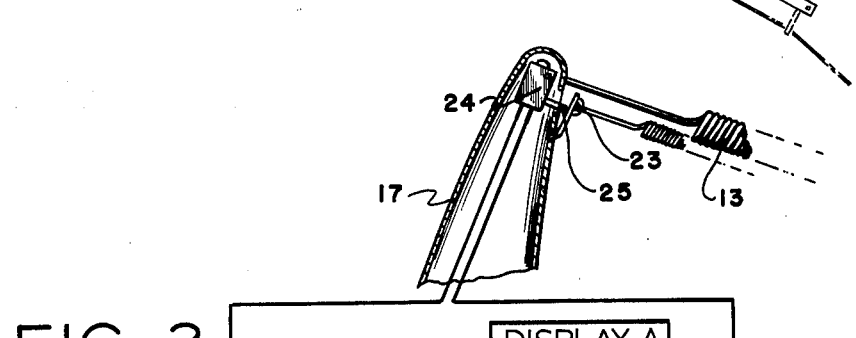
FIG 3
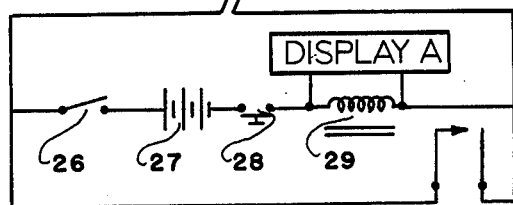

FISHING POLE

FIELD OF INVENTION

The present invention relates to fishing poles, and more particularly to a mechanically flexed fishing pole.

BACKGROUND OF THE INVENTION

Fishing poles of the prior art have been fabricated of shafts having a predetermined characteristics of flex and resiliency which correspond to desired fishing pole resistance for both casting and retrieving. Tubular shafts made of bamboo, and modernly tubular fiber glass, are considered highly desirable for the purpose.

Several undesirable characteristics of tubular flex construction of fishing rods may be identical. Tubular resiliency is achieved by this method at the sacrifice of strength; when the flexing characteristics of the tubular shaft is exceeded, the shaft breaks. Flex characteristics of a tubular fishing pole cannot be changed. Length required of a tubular pole to achieve a selected flex is determined by the length of the pole; the length of the pole cannot be altered without sacrificing mechanical function.

Accordingly, it is a primary object to the present invention to provide a fishing pole which provides the functional characteristics of flex and tubular resiliency by mechanical means.

It is a further object of this invention that the present mechanically flexed fishing pole be fabricated with a plurality of hingedly joined, rigid rod sections, and a suitably mounted biasing means urging the rod sections into a predetermined configuration. It is a corollary object that means biasing the rod sections be changeable in its spring constant. It is a still further corollary object to this invention to provide hinges joining the rod sections which are conveniently demountable.

It is another primary object to this invention to provide further embodiments of the present mechanically flexed fishing pole wherein a rigid fishing pole frame is provided with a mechanical equivalent for tubular tension.

It is still another object to this invention that the aforesaid mechanical means providing mechanical tension be employed in combination with electromechanical switches to provide alarms signaling the presence of a fish on the line.

These and other objects shall become apparent from the description following, it being understood that modifications may be made without affecting the teachings of the invention here set out.

SUMMARY OF THE INVENTION

The fishing pole comprises at least a pair of hingedly mounted, rigid rod sections, and a spring biasing the rod sections with a predetermined spring constant. In further embodiments the fishing pole may include a multiplicity of rod sections, and arrangement of springs including springs mounted between an outrigger, or internally mounted springs. The fishing rod may be adapted to electric warning signals and the like which employ the hinged mounting and mechanically urged structure. A still further embodiment employs a rigid pole frame and a spring urging means simulating tubular flex.

A more thorough and comprehensive understanding may be had from the detailed description of the preferred embodiment when read in connection with the drawings forming a part of this specification.

BRIEF DESCRIPTION OF DRAWINGS

FIG. 1 is a side elevational view of the fishing pole of the present invention shown with its hingedly mounted sections deflected in broken line for illustrative purposes.

FIG. 2 is a side elevational view of a further embodiment of the present invention employing three rigid tubular sections.

FIG. 3 is a semi-diagrammatic view of an electric circuit providing a warning signal for the presence of a fish on the line.

DETAILED DESCRIPTION OF THE PREFERRED EMBODIMENT

Referring now to the drawings and more particularly to the FIG. 1, the fishing pole of this invention is shown to advantage and generally identified by the numeral 10. The fishing pole comprises a first rod-like section 11, a second rod-like section 12 hingedly mounted to at one of its terminal ends to the first section 11, and a spring biasing the rod sections with a predetermined spring constant into general alignment.

The first rod section 11 is proportioned to conveniently carry a handle 14, and a fishing line reel 15. The second rod section is section 12 is mounted by a pivot hinge 16, which permits the section 12 to pivot vertically in the normal orientation of the pole 10 over a limited travel. The sections 11 and 12 are intended to be fabricated of rigid materials which may include metal, channel, or tubular extrusions.

It may be seen that the pole 10 may be adapted to demountable construction by providing a demountable hinge 16.

The spring 13 may be any of a variety of types which may be mounted exteriorly or internally of the sections 11 and 12. The exemplar shown in the FIG. 1 comprises an outrigger 17, which issues upwardly from the first section 11, and a spring 13 mounted between the outer terminal end of the outrigger 17 and the outermost terminal end of the second section 12. It has been found to advantage to orient the outrigger 17 at an obtuse angle with respect to the handle 14 of the section 11, to provide better reception of load when the section 12 is being pivoted downwardly. The spring 13 may be fabricated of any of a number of types including coil springs, elastomeric springs, and the like.

The fishing line 18 from the reel 15, is carried through a first ferrule 19 mounted distally from the interior vertex formed by the section 11 and 12 to the lowermost side of the first section 11, and a second ferrule 19 mounted on the lower side and distally from the terminal end of the second section 12.

In operation, a load on the fishing line 18 results in a load at the second ferrule 19 which pivots the second rod section 12 with the predetermined spring constant. This action by the sections 11 and 12 and the spring 13 simulate the action of a tubular fishing rod. It may be seen that the spring constant with which the sections 11 and 12 are biased may be changed by such means as demountable fastening of the spring 13, adjusting screws which may change the angle of attack of the outrigger 17, and turnbuckles 20 employed to mount one of the terminal ends of the spring 13 and the outrigger 17, or combinations thereof.

Referring to the FIG. 2, the smoothness with which the pole 10 produces pole tension resiliency in the line 18 may be increased by increasing the number of sections in the pole 10. The embodiment of FIG. 2 comprises a first section 11 which is similar to the section 11 above, a second section 12 having the same purpose and function as the section 12 above, and an intermediate section 21 which is pivotally mounted between the respective terminal ends of the sections 11 and 12. In the further embodiment the spring 13 is mounted between an outrigger 17 mounted to the first section 11, and to an appropriate point on the second section 12. It may be seen that the number of intermediate sections 21 may be increased as desired. It has been found to advantage to provide means for handling the line 18 at each point of articulation.

The pole 10 may be adapted to provide electric signals and warning devices by application of electromechanical switches responsive to the various points of articulation in the period. As shown in FIGS. 2 and 3 a microswitch 22 may be mounted in the outer terminal end of the outrigger 17, and be provided with a spring connection responsive to pivoting of the second section 12. The spring connection may be provided by a secondary elastomeric spring mount between the point of connection of the spring 13 in the second section 12 and a shackle 23 pivoted at the mounting point of the outrigger 17. A normally open microswitch 24 is connected by its plunger 25 to the shackle 23. Elongation of the spring pulls the plunger 25 to close the switch 24. The electric circuit controlled by the microswitch 25 comprises in series a main "on/off" switch 26, a power source 27, a reset switch 28, and relay assembly controlling in display A. The displaying A may be of any of a variety of types including buzzers, horns, lamps, and the like. The circuit may also be modified to activate self-power devices such as voice recording devices, and the like. Upon activation of the microswitch 24, the relay 29 is caused to close producing a constant signal showing the presence of a fish, or the like. The signal will continue until a reset button 28 deactivates the circuit or the switch 26 is opened.

Referring to the FIG. 4, a still further embodiment of the pole 10 employs a rigid handle or frame 30, wherein mechanical line resiliency is produced by a spring 30, one mounted between one of the frames 30, and to a journaled pulley 32. The end portion of the frame 30 opposite that carrying the spring 31 is provided with a second journaled pulley 33, and a journaled third pulley 34, which are free to rotate, but are fixed in their juxtaposition on the frame 30. A reel 15 is mounted on a bracket 35 which is itself mounted dependently midway on the frame 30. Line 18 from the reel 15 is carried over the outer terminal side of the pulley 33 around the pulley 32, and over the pulley 34 to the water. Drag on the line 18 results in extension of the spring 31 at a predetermined spring constant. It may be seen that the pulleys 32, 33, and 34 are equivalence in this embodiment to the ferrules 19 above.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A fishing pole comprising:

a first rod section fabricated of a rigid material, a handle at one end thereof, said rod section carrying a reel and a ferrule;

a second rod section being fabricated of a rigid material and being hingedly mounted at one of its terminal ends to the other end of said first rod section, said second rod section having on its outer terminal end a ferrule, fishing line from said reel being strung through said ferrule on said first rod section and through said ferrule on said second rod section; and means urging said first and second rod sections into alignment, including an outrigger issuing transversely from the other end of said first section at an obtuse angle with respect to said handle and being rigidly mounted to said first section, and a spring which is mounted between the outer end of said outrigger and the outer end protion of said second section.

2. The apparatus of claim 1 wherein said means urging said first and said second rod sections into alignment is a coil spring.

3. The apparatus of claim 1 wherein said outrigger is inclined toward the outer terminal end of said pole to dispose the point of connection between said outrigger and said spring over said second rod section.

4. The apparatus of claim 1 wherein an intermediate rod section is hingedly mounted between said first rod section and said second rod section, and wherein said means urging said first and second rod sections into alignment is provided with means urging said intermediate section into alignment with said first and said second rod sections.

5. The apparatus of claim 1 wherein an electric warning device comprising an electric circuit including a microswitch mounted in said fishing pole to be responsive to articulation of said rod sections, a source of electric power, a reset switch and a relay which is a relay of the normally-open type, said relay controlling an electrically activated display.

6. The apparatus of claim 5 including in series a main on-off switch controlling operation of said warning device.

* * * * *